United States Patent
Androulaki et al.

(10) Patent No.: US 10,565,588 B2
(45) Date of Patent: Feb. 18, 2020

(54) CRYPTOGRAPHIC METHODS IMPLEMENTING PROOFS OF WORK IN SYSTEMS OF INTERCONNECTED NODES

(71) Applicant: International Business Machines Corporation, Armonk, NY (US)

(72) Inventors: Elli Androulaki, Zurich (CH); Mircea Gusat, Langnau (CH); Ioannis Koltsidas, Zurich (CH); Maria Soimu, Langnau (CH)

(73) Assignee: International Business Machines Corporation, Armonk, NY (US)

( * ) Notice: Subject to any disclaimer, the term of this patent is extended or adjusted under 35 U.S.C. 154(b) by 1146 days.

(21) Appl. No.: 14/645,587

(22) Filed: Mar. 12, 2015

(65) Prior Publication Data
US 2016/0358169 A1 Dec. 8, 2016

(51) Int. Cl.
G06Q 20/40 (2012.01)
G06F 16/951 (2019.01)
G06F 16/2457 (2019.01)
G06Q 20/06 (2012.01)

(52) U.S. Cl.
CPC ..... G06Q 20/401 (2013.01); G06F 16/24578 (2019.01); G06F 16/951 (2019.01); G06Q 20/065 (2013.01)

(58) Field of Classification Search
None
See application file for complete search history.

(56) References Cited

U.S. PATENT DOCUMENTS

| | | | | |
|---|---|---|---|---|
| 6,654,783 B1 | 11/2003 | Hubbard | | |
| 7,139,747 B1* | 11/2006 | Najork | ............... | G06F 16/951 |
| 8,136,025 B1* | 3/2012 | Zhu | .................. | G06F 16/951 |
| | | | | 715/200 |
| 8,170,971 B1* | 5/2012 | Wilson | ................. | G06N 3/02 |
| | | | | 706/46 |
| 2005/0256887 A1* | 11/2005 | Eiron | .................. | G06F 16/951 |
| 2010/0287152 A1* | 11/2010 | Hauser | ............. | G06F 16/951 |
| | | | | 707/707 |

(Continued)

FOREIGN PATENT DOCUMENTS

| | | |
|---|---|---|
| CN | 101243643 A | 8/2008 |
| CN | 102916963 A | 2/2013 |
| DE | 102016104478 A1 | 9/2016 |

OTHER PUBLICATIONS

Reed, ("Bitcoin Cooperative Proof-of-Stake", arXiv:1405.5741, May 21, 2014, 16 pages) (Year: 2014).*

(Continued)

*Primary Examiner* — James D Nigh
(74) *Attorney, Agent, or Firm* — L. Jeffrey Kelly (57) ABSTRACT

The present invention is notably directed to methods, systems and computer program products for securing data operations in a computerized system comprising interconnected nodes, wherein the nodes are configured to transmit, receive and store data, and wherein the method comprises executing computerized cryptographic methods to implement two or more proofs of work that comprises: provably crawling, from each node of at least a subset of the interconnected nodes, a respective subset of data stored on nodes of the system; and provably acquiring, at each node of the subset, data in the subset of data.

20 Claims, 4 Drawing Sheets

(56) References Cited

U.S. PATENT DOCUMENTS

| | | | | |
|---|---|---|---|---|
| 2010/0318426 A1* | 12/2010 | Grant | ................ | G06Q 20/10 |
| | | | | 705/14.66 |
| 2012/0110063 A1* | 5/2012 | Prasad | ................ | G06Q 10/06 |
| | | | | 709/203 |
| 2012/0143844 A1* | 6/2012 | Wang | ................ | G06F 16/951 |
| | | | | 707/709 |
| 2014/0067451 A1* | 3/2014 | Balamurugan | ........ | G06Q 10/06 |
| | | | | 705/7.14 |
| 2014/0149385 A1 | 5/2014 | Rose et al. | | |

OTHER PUBLICATIONS

Herrmann et al. ("Censorship-Resistant and Privacy-Preserving Distributed Web Search", 14th IEEE International Conference on Peer-to-Peer Computing, Mar. 2014, 10 pages) (Year: 2014).*
Handley, "P2P Search as an Alternative to Google: Recapturing Network Value Through Decentralized Search", http://peerproduction.net/issues/issue-3-free-software-epistemics/peer. Accessed Mar. 9, 2015. pp. 1-13.
"Distributed Search Engines, and Why We Need Them in the Post-Snowden World", http://www.tecdirt.com/articles/20140701/03143327738/distributed-se. Accessed Mar. 9, 2015. pp. 1-8.
http://novacoin.org/. Accessed Mar. 9, 2015.
"What If We Could Build a Decentralized Search Engine?", http://reddit.com/r/Bitcoin/comments/2j748z/what_if_we_could_bu. Accessed Mar. 9, 2015 pp. 1-7.

* cited by examiner

| Proofs of work computation (interacts with data 'corpus' storage) | Query processing (manages transaction queries and responses) | Application layer |
|---|---|---|
| Presentation | | Communication layer |
| Session | | |
| Transport | | |
| Network | | |
| Data link | | |
| Physical | | |

FIG. 4

CRYPTOGRAPHIC METHODS IMPLEMENTING PROOFS OF WORK IN SYSTEMS OF INTERCONNECTED NODES

BACKGROUND

Embodiments of the present invention relates in general to the field of cryptographic methods to implement proofs of work, such as cryptocurrency systems.

Web search engines are software systems designed to search, index, organize and rank information on the World Wide Web. The information may include web pages, images and other types of files. Search engines may also mine data available in databases or open directories. Unlike web directories, search engines maintain quasi-real-time information thanks to web crawlers (i.e., spiders), which store information about web pages retrieved from the HTML markup of the pages. These pages are retrieved by web crawlers, which follow every link on the site. The search engine then analyzes the contents of each page to determine how it should be indexed; for instance, words can be extracted from the titles, contents, headings or metatags. Data about web pages are stored in an index database for use in later queries.

Cryptocurrency systems, such as Bitcoin™, use cryptography to secure transactions. Typically, cryptocurrency systems use decentralized control (as opposed to centralized money systems) and a public ledger (e.g., Bitcoin's block chain) which records transactions. Cryptocurrencies use various timestamping schemes to avoid the need for a trusted third party to timestamp transactions added to the blockchain ledger. The first timestamping scheme invented was the proof-of-work (PoW) scheme. The most widely used PoW schemes are based on the so-called SHA-256 algorithm, introduced by Bitcoin™, and scrypt. Other hashing algorithms used for PoW include Blake, SHA-3, and X11. Some cryptocurrency systems use a combined proof-of-work/proof-of-stake scheme. The Proof-of-stake is a method of securing a cryptocurrency network and achieving distributed consensus by requesting users to show ownership of a certain amount of currency. It differs from PoW systems that run resource-intensive hashing algorithms to validate electronic transactions and to generate new currency units (i.e., mining or coin-minting).

SUMMARY

According to an embodiment, a method is disclosed for securing data operations in a computerized system composed of interconnected nodes configured to transmit, receive and store data, and for executing computerized cryptographic methods to implement two or more proofs of work by provably crawling, from each node of at least a subset of the interconnected nodes, a respective subset of data stored on nodes of the system and provably acquiring, at each node of the subset, data in the subset of data.

According to another embodiment, a computerized system is disclosed for securing data operations, comprising interconnected nodes configured to transmit, receive and store data, and for executing computerized cryptographic methods to implement two or more proofs of work by provably crawling, from each node of at least a subset of the interconnected nodes, a respective subset of data stored on nodes of the system, and provably acquiring, at said each node of the subset, data in said subset of data.

According to another embodiment, a computer program product, composed of a computer readable storage medium having program instructions embodied therewith, is disclosed. The program instructions may be executable by nodes interconnected in a computerized system for securing data operations, to cause the nodes to execute computerized cryptographic methods to implement two or more proofs of work by provably crawling, from each node of at least a subset of the interconnected nodes, a respective subset of data stored on nodes of the system, and provably acquiring, at said each node of the subset, data in said subset of data.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which not all structures may be shown.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art.

For purposes of the description hereinafter, the terms "upper", "lower", "right", "left", "vertical", "horizontal", "top", "bottom", and derivatives thereof shall relate to the disclosed structures and methods, as oriented in the drawing figures. It will be understood that when an element such as a layer, region, or substrate is referred to as being "on", "over", "beneath", "below", or "under" another element, it may be present on or below the other element or intervening elements may also be present. In contrast, when an element is referred to as being "directly on", "directly over", "directly beneath", "directly below", or "directly contacting" another element, there may be no intervening elements present. Furthermore, the terminology used herein is for the purpose of describing particular embodiments only and is not intended to be limiting of the invention. As used herein, the singular forms "a," "an," and "the" are intended to include the plural forms as well, unless the context clearly indicates otherwise.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Figure 1:
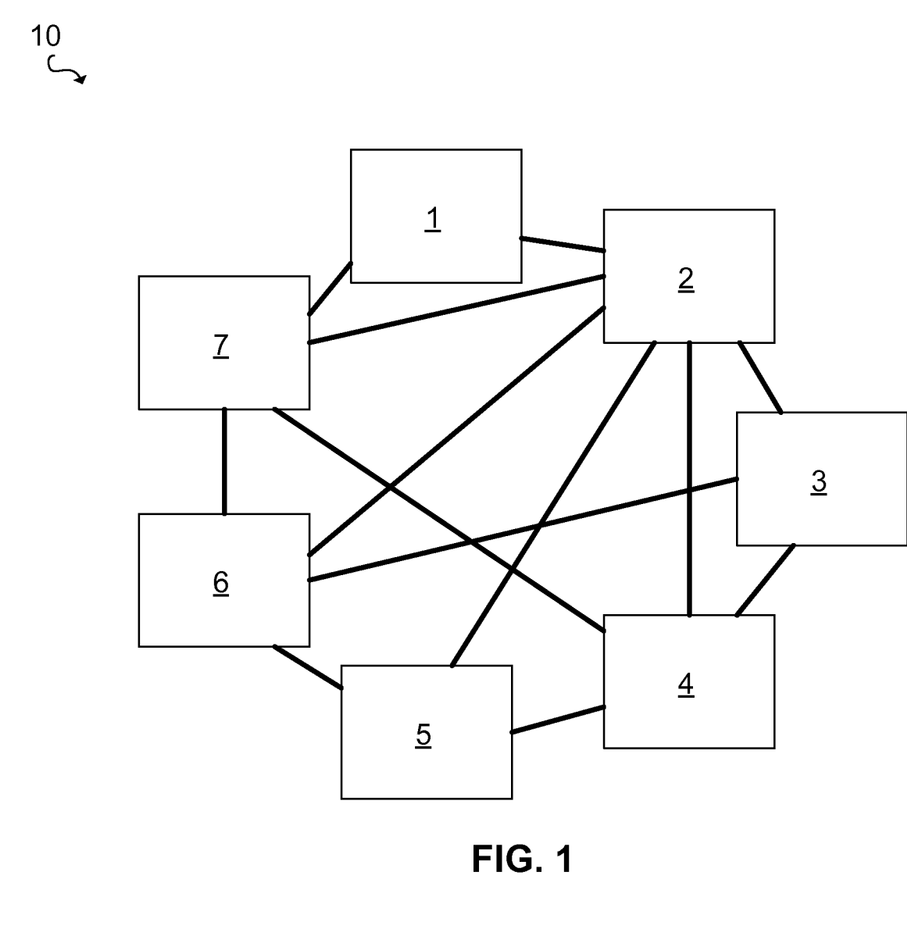
FIG. 1 schematically represents a computerized system comprising a set of nodes interconnected in a peer-to-peer (point-to-point, directly or indirectly) fashion, according to an embodiment of the present invention.

In reference to FIGS. 1-4, embodiments of the present invention, which may include methods for securing data operations in a computerized, are described. As shown in FIG. 1, system 10 is assumed to comprise interconnected nodes 1-7. Each of the nodes is configured to transmit, receive and store data. The present computerized methods may be executed at one or (typically) more nodes of the system, and include executing computerized cryptographic methods to implement two or more proofs-of-work (hereinafter "PoWs").

The concept of PoW is generally known from cryptocurrency systems. However, and in contrast with known cryptocurrency systems, here the PoWs comprise at least the operations S20 and S30, shown in the flowchart of FIG. 3.

Figure 3:
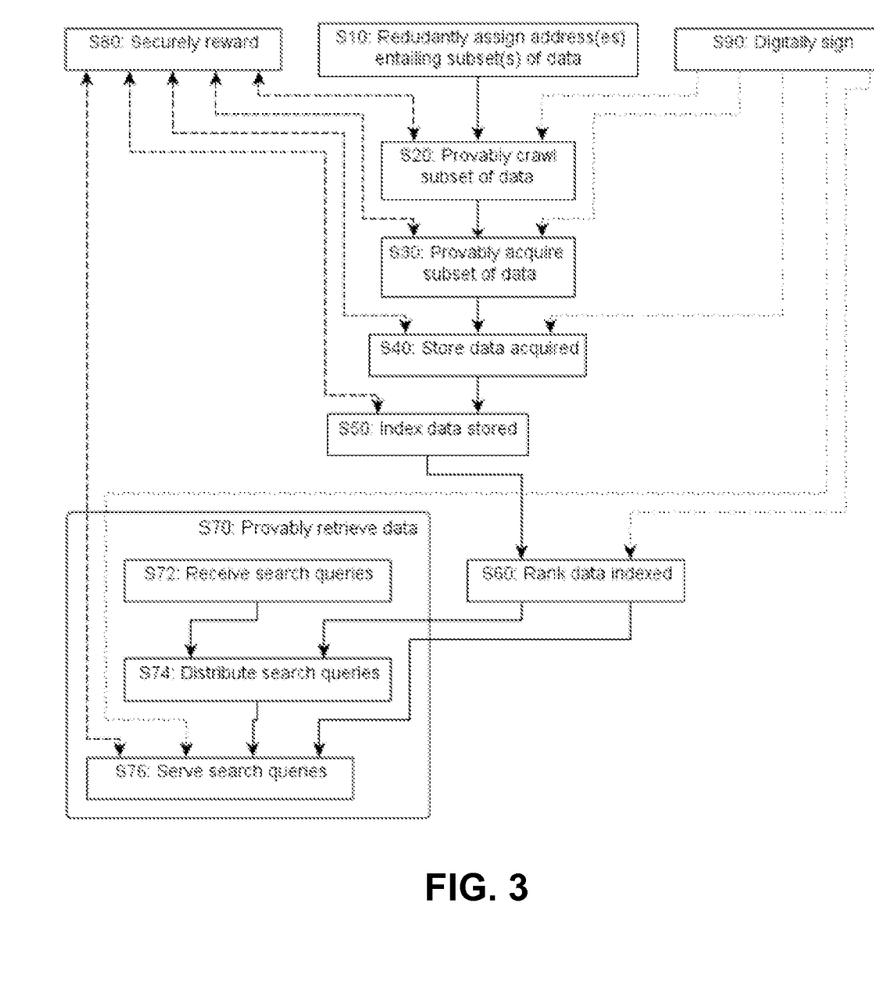
FIG. 3 is a flowchart illustrating high-level steps of a method of securing data operation, according to embodiments, according to an embodiment of the present invention.

First, the execution of the cryptographic methods cause a respective subset of data to provably crawl S20, from each node of the system, or at least a subset of nodes thereof (hereinafter "nodes"). Nodes that actively contribute to present PoWs can be compared to nodes referred to as "workers" or "miners" in cryptocurrency systems. Each data subset is stored on (i.e., across) nodes of the system or in communication therewith. Note that crawling operations are performed from one or more nodes, and, therefore, a set of crawlers may be assigned to one or more nodes. It should be noted that the concept of crawling data is well known in the art.

A computerized system 10 such as depicted in FIG. 1 may be restricted to a small system, for example a private network or a company network, or, as another example, may include a company network in communication with one or more third-party networks, to form a computerized system. Thus, the data to be crawled is not necessarily stored on a particular node that triggers the crawling operations. Rather, the data may be scattered through different nodes of one or more interconnected nodes.

Second, the execution of the cryptographic methods causes the system to provably acquire S30 the data subset crawled. In other words, steps are taken at each node of the system (or at least a subset of nodes thereof) to acquire data in the subsets of data crawled. Acquiring data means for a node to obtain the data (i.e., data is transmitted to the node in the form of electrical signals), such that the node will later be able to store the data is needed.

Thus, the system 10 may run cryptographic methods to implement PoWs that may include, at least, the above operations of crawling/acquiring data. In other words, and owing to the nature of the PoWs performed, the present cryptographic methods augment and redefine features of known cryptocurrency systems. Still, embodiments of the present methods may nevertheless retain some of the already known features of cryptocurrency systems, such as the provability of operations performed, which may in turn involve already established blockchain, timestamping, digital signatures and other protocols known in cryptocurrency systems.

The concept of PoW is for instance known from the Hashcash™ and Bitcoin™ systems. The concept of PoW is generally retained here. However, here the PoW operations will at least include the above crawling/acquiring operations, in contrast with known cryptocurrency systems. Other PoW operations can be involved, which are described below. The concept of cryptocurrency hashes may, in embodiments, be replaced or retained and augmented by or with PoWs as described herein.

Like cryptocurrency systems, present systems can be regarded as a medium of exchange using cryptography to secure transactions, although the transactions contemplated here are of a different nature and imply prior data crawling and acquisition. Thus, embodiments of the invention have similarities with the Bitcoin™ blockchain concept. For instance, exemplary embodiments may comprise a timestamp server, a global sequencer and broadcast protocols. However, all embodiments discussed here include operations of crawling and acquiring data, which shall typically find applications in search-based PoWs.

Cryptographic methods are used to secure the data and data operations and thereby guaranty that the operations have indeed been performed. Present systems run cryptographic methods to secure data and, preferably, to secure data transmissions as well. Thus, the present embodiments do not merely restrict to repurposing a cryptocurrency system for performing useful (mining) work; they also allow the results of the PoWs, including the data crawled, acquired, and also indexes obtained, queries served and other related operations, to be secured. Indeed, provably acquiring data at legitimate nodes may in turn allow additional PoWs to be performed, as discussed below in detail.

In embodiments, the system 10 is preferably decentralized, peer-to-peer, or, in variants, may encompass some hierarchical topology combined with a peer-to-peer architecture. In other variants, however, the system 10 may not be peer-to-peer, in which case the subsets of data to be crawled may need to be assigned "non-democratically", as opposed to peer-to-peer architectures. This is discussed in more detail below.

In embodiments, and prior to crawling the data subsets, the present methods may further comprise a step of assigning S10 addresses to each active node (i.e., a node that shall later trigger crawling operations). Each of the assigned addresses is a reference to some digital resource (like a Uniform Resource Locator or URL). Thus, subsequent steps of crawling can be performed, from each active node, according to addresses assigned to the node.

The addresses are preferably provided by the system itself (i.e., by one or more other nodes of the system). The addresses may for instance include URL or Internet Protocol (IP) addresses. An address may, for example, correspond to an HTML page, which links to other HTML pages. Thus, an address may correspond to a subgraph of a data corpus graph (e.g., the Internet corpus graph). The data corpus graph is the graph of the data to be crawled and acquired. Thus, providing addresses to the nodes amounts to assigning subgraphs of the data corpus graph to be crawled. The space crawled from a node may, for instance, comprise the Internet or any other communication network (e.g., the Internet of Things or a private network), or subparts or any combinations of subparts thereof.

As evoked earlier, present systems may for instance be peer-to-peer systems and shall, therefore, preferably involve a decentralized crawling proof of crawl, whereby crawlers are assigned respective subgraphs, independently, by the system. This may, for instance, be achieved by way of distributed hash tables (DHTs) to prevent undesired interferences. More generally, the present systems' topology may be, for example, peer-to-peer, centralized or hybrid. The system topology determines the nodes' graph, distinct from the data corpus graph. The two graphs may, for instance, be mapped via multiple bijections. The data vs. nodes mapping can be optimized with classical methods from graph theories and scheduling theory, such as Bipartite Graph Matching (BGM), amongst other examples of known mappings. Then, each node may assign a respective set of one or more crawlers, performing independent tasks, such as exploring the data subgraph assigned to each node by way of DHTs. In that sense, the crawling operations are performed from each of the worker nodes.

The subgraphs can be assigned as follows: one may hash data representing the data graph structure; and then perform a divide and conquer of the graph to obtain the subgraphs, which themselves can be hashed. This can be implemented by means of DHTs, which allows for proof of integrity of the subgraphs. However, using DHTs is only one option, which, incidentally, is not particularly suitable for some types of query-based search. For other topologies (e.g., trees, k-ary n-cubes, and k-ary n-flies), alternative, not necessarily fully decentralized, options to the DHT are considered, such as linked/skip-lists, supernodes with flooding, or global routing tables known to the system-elected supernodes.

As illustrated in the flowchart of FIG. 3, the present methods may preferably comprise securely rewarding S80 one or more of the PoWs using a cryptocurrency-like protocol to reward active participants. More generally, any protocol suited to a secure rewarding mechanism may be contemplated. Depending on the protocol chosen, the reward may take the form of assets, units (possibly tokens associated with currency units, as e.g., in the so-called "Folding-Coin" system) or any other suited reward mechanism, which shall preferably scale with the amount of work provably performed by the nodes. The reward mechanism may also take into account other factors like the work effort, time, the resource allocation, etc. In particular, the system may reward S80 nodes that have caused to: (i) provably crawl respectively assigned data and/or (ii) provably acquired such data. More generally, the system may advantageously reward each of PoWs.

In embodiments, the system 10 may comprise a reputation system tightly coupled with the rewarding system, to increase the credibility of the highly rewarded nodes as opposed to less active or newer nodes, whose results might at times conflict with those returned by more reputable nodes.

It should be emphasized that the rewarding system and the reputation system(s) evoked above may be embodied by one or more of the nodes 1-7 of the system. Similarly, any of the steps depicted in FIG. 3 may be implemented by one or more of, or any one or any combination of the nodes of the system. Namely, in a peer-to-peer, decentralized node architecture, any one or more, or each of the steps depicted in FIG. 3 may be implemented by each of the active nodes. Any node can perform data crawling, data acquisition, participate in rewarding, timestamping, signing, etc. In "less" decentralized system architecture, one or more nodes may be assigned specific operations. One node may be dedicated to digital signature, another one to rewarding, etc.

Advantageously, present methods may seek to redundantly assign S10 the same addresses to two or more of the nodes, in order to obtain a redundancy of the crawling operations to be subsequently performed by the active nodes. This can be achieved by any suitable election mechanism. A redundant assignment makes it possible to reach a desired redundancy of the data crawled and acquired, which in turn allows to improve the reliability and confidence in the results. Redundancy may further be leveraged to prove that a node has genuinely performed its crawling task. For instance, a simple 2k+1 redundancy can be implemented, for breaking ties and acquiring majority.

As said earlier, data crawling and acquisition are minimal PoWs performed by the present methods. Beyond these minimal PoWs, the present methods may further comprise storing S40, at each active node, data that it has acquired. Storing operations institute a third PoW. Again, redundancy is desired, to secure the archival of the data crawled. Note that complex protocols are contemplated to ensure redundancy of data stored notwithstanding possible data exchange between the nodes. Indeed, present methods do not preclude the possibility for the nodes to re-organize data storage across the nodes. Just like before, the third PoW operations are preferably rewarded by the system. The same cryptocurrency protocol as used for rewarding crawling/acquiring operations may be used to reward the third PoW (and any other PoW, if any). The proof of a node having correctly crawled, acquired, stored (and also retrieved, see below) data can be secured cryptographically. Redundancy can also be used, independently or complementarily to cryptographic methods, to establish the proofs.

The cryptographic methods shall preferably be configured such that a requestor (i.e., any connected computerized unit requesting data) can provably retrieve data stored on nodes of the system according to a crypto-protocol and using redundancy. Namely, the present methods may further include steps of provably retrieving S70 data stored on the nodes of the system 10. The requesting party may for instance be a node of the system. Owing to the possible system configurations discussed earlier, the requestor may be a third-party, such as an external client node communicating with a node of the core system (but still forming with it an extended computerized system). An example of a suitable crypto-protocol is the so-called zero-knowledge proof protocol, which can be specifically adapted to the context of the present embodiments, if needed.

Retrieving data stored on the nodes is one practical way to enable the proof of storage. However, since data retrieval is an operation distinct from storing data, data retrieval is counted as a distinct PoW (here the fourth PoW). The retrievability proof may incur delays, which may possibly be unacceptable for some applications. Thus, embodiments of the present invention may seek to quickly retrieve a provisional result from, for example, a highly reputed node, and the low latency early result may, if necessary, later be invalidated by the proof (the delay would typically be of a few milliseconds to seconds, depending on the exact contexts).

Embodiments may further comprise indexing S50 data stored on the nodes and ranking S60 results of indexations. Indexing proves useful in many scenarios. Indexing data shall preferably be performed after storing the data acquired. In an embodiment, indexing data may be performed on-the-fly, by parsing data acquired, before or while storing the data (data indexing operations are well known in the art). However, indexing is not mandatory, notably in cases of requests for raw data only. Each node may take steps to index data it stores, or not. Whether indexed or not, any node may later receive requests for raw (crawl, also known as corpus) data only, as opposed to requests for key or value indexed data.

In the present context, ranking may advantageously be performed using redundancy of the data stored on the nodes. Note that ranking is usually based on a heuristic linear equation of 'secret' factors, such as the number of graph edges, WWW references, or links made to a page. Of course, and beyond redundancy, other criteria may be used, such as reputation, which itself may use confidence put in the results (by the users) and/or confidence based on previous work done. Redundancy may also be used in addition to reputation, to further rank the results. Again, a decentralized consensus is preferably sought, as assumed in the system of FIG. 1.

Indexing operations institute a fifth PoW, which shall preferably be rewarded S80 too. Namely, present methods may securely reward S80 nodes having provably indexed data stored thereon, according to a suited cryptocurrency-like protocol. The proof of correct indexing may for instance be similar to that of retrievability. A <key, value> algorithm like, for example, MapReduce, as in Hadoop, can be used. However, such algorithms involve high latency batch-processing that typically requires clusters of 10s to 1000s of worker nodes. Hierachical and incremental algorithms have recently emerged, e.g., Spark, Caffeine, and Percolator, which maintain the interim state and may be better suited to the present context. Generally, any intensive operation performed by the nodes should preferably be provably correct and appropriately rewarded (in tokens or currency units).

As evoked earlier, the system shall furthermore be preferably configured for receiving and processing S70 data search queries, be it from internal nodes or client nodes. To that aim, the system 10 may distribute S74 the data search queries received at step S72 across active nodes, to serve S76 the data search queries received.

Managing queries institute a sixth PoW. Managing such queries implies such basic operations as receiving, distributing (load-balancing), and serving queries. Yet, in embodiments, additional operations may be involved, such as organizing queries as well as processing and organizing queries' results. The data search queries may be distributed according to previous ranking operations. This may be based on nodes' reputations and their capabilities, e.g., compounded in a service/Quality-of-Service (QoS) equation. The queries may otherwise be distributed, taking into account a redundancy of the data stored on the system's nodes, the actual load, occupancies and the metrics to optimize (delay, quality/reliability etc.). Again, low latency and confidence in early results can be optionally injected by high reputation nodes (e.g., by popular clusters that may be part of the present systems). These could be later refined or even invalidated by the final results. In other variants, the data search queries may be distributed according to both ranking results and redundancy.

As illustrated in FIG. 3, present methods shall preferably securely reward S80 nodes having provably served search queries, using any suitable protocol.

As further illustrated in FIG. 3, one or more of the PoWs may be digitally signed S90 to make it possible to prove operations performed by the node. Preferably, each of the PoWs is digitally signed. To that aim, the system may comprise a dedicated digital signature unit, arranged in communication with the nodes. In a decentralized architecture, a digital signature protocol is implemented by the interconnected nodes 1-7 shown in FIG. 1.

The cryptographic methods executed by the system enable the PoWs discussed herein. Interestingly, the same cryptographic methods may be used to secure the data stored on the nodes as well as data transmissions across the nodes. The present computerized methods may further be configured to ensure redundancy of the data crawled and acquired by the nodes, across the nodes.

The above features may be combined in various ways. For instance, present methods may be embodied as peer-to-peer methods, implementing steps to: crypto-secure the data stored on and operations performed by the system, arranged as a decentralized search engine (as opposed to just archiving arbitrary repositories); and reward work performed by the nodes, wherein outputs from the reward mechanism may be used to increase the reputation of the nodes and their chances to be favored in future crawling and query management operations.

In addition, such methods may be used to: (i) augment the search capability with new ranking algorithms, taking advantages of a (possibly highly) redundant peer-to-peer system; and (ii) improve, if not replace, the wasteful hash-based PoWs as currently implemented in popular cryptocurrency systems. Still, since the present systems and methods provide a medium of exchange using cryptography to secure transactions, some of the features of the current cryptocurrency systems may be retained, such as digital signatures and crypto-protocols.

Figure 2:
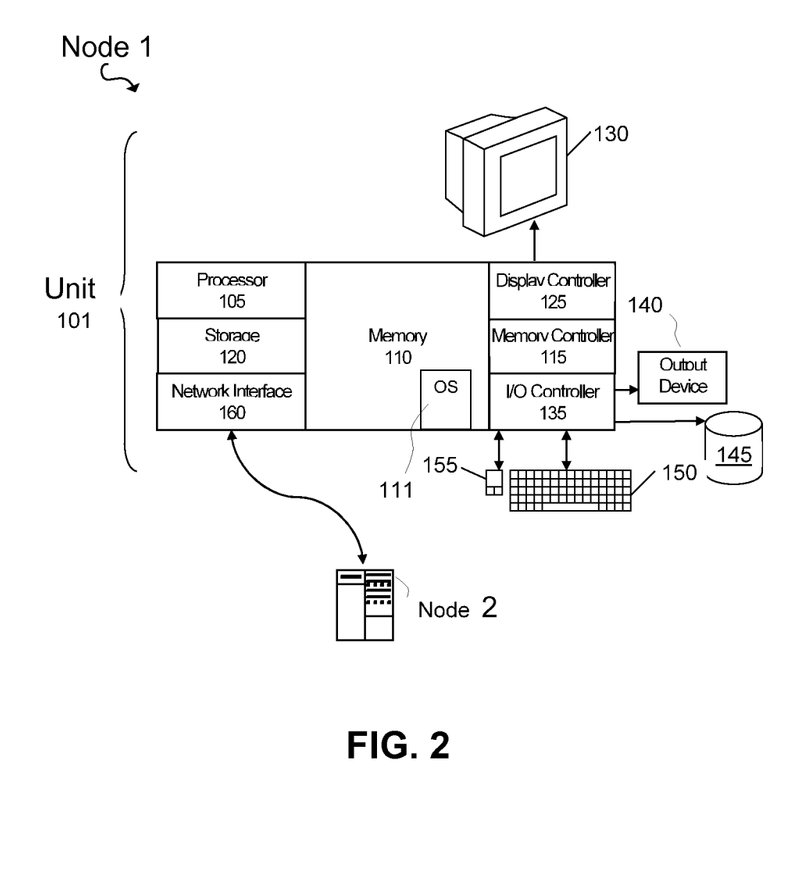
FIG. 2 schematically represents a typical node (in fact a general purpose computer) of a system such as depicted in FIG. 1, according an embodiment of the present invention.

As discussed in detail above, the present invention can be embodied as a method. It can also be embodied as a computerized system 10. As depicted in FIGS. 1 and 2, the computerized system 10 may include interconnected nodes 1-7, configured to transmit, receive and store data. The nodes are furthermore configured for executing computerized cryptographic methods as described above.

Finally, the present invention can be implemented as a computer program product, comprising a computer readable storage medium having program instructions embodied therewith. The program instructions are executable by the nodes 1-7 of the system 10, causing the latter to execute computerized cryptographic methods as described herein, whereby two or more PoWs can be implemented.

At present, more shall be said about the system and computer-program implementations. Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software, hardware, or a combination thereof. In exemplary embodiments, the methods described herein are implemented in software, as an executable program, executed by suitable digital processing devices. More generally, embodiments of the present invention can be implemented, wherein general-purpose digital computers, such as personal computers, workstations, etc., are used as the present nodes 1-7.

For instance, the node 1 is schematically represented in FIG. 2. The node 1 may be a computerized unit 101, for example, a general-purpose computer. In exemplary embodiments, in terms of hardware architecture, as shown in FIG. 2, the unit 101 includes a processor 105, memory 110 coupled to a memory controller 115, and one or more input and/or output (I/O) devices 140, 145, 150, 155 (or peripherals) that are communicatively coupled via a local input/output controller 135. The input/output (or I/O) controller 135 can be, but is not limited to, one or more buses or other wired or wireless connections, as is known in the art. The I/O controller 135 may have additional elements, which are omitted for simplicity, such as controllers, buffers (caches), drivers, repeaters, and receivers, to enable communications. Furthermore, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the unit 101, a semiconductor-based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 2, the software in the memory 110 includes methods described herein in accordance with exemplary embodiments and, if necessary, a suitable operating system (OS) 111. The OS 111 essentially controls the execution of other computer programs, such as the methods as described herein, and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Possibly, a conventional keyboard 150 and mouse 155 can be coupled to the I/O controller 135. In addition, the I/O devices 140-155 may further include devices that communicate both inputs and outputs. The unit 101 can further include a display controller 125 coupled to a display 130. The unit 101 shall further include a network interface or transceiver 160, or any suitable communication means to communicate with other nodes 102, via a data communication network 165. The network 165 transmits and receives data between the nodes 1-7, and external systems, if needed. The network 165 is possibly implemented in a wireless fashion, e.g., using wireless protocols and technologies, such as WiFi, WiMax, etc. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals. The network 165 can also be an IP-based network for communication between the node 1 and any external node 2 (server, client, . . . depending on the architecture retained) via a broadband connection. In exemplary embodiments, network 165 can be a managed IP network administered by a service provider. Besides, the network 165 can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the unit 101 is activated.

When the unit 101 is in operation, the processor 105 is configured to execute software stored within the memory 110, to communicate data to and from the memory 110, and to generally control operations of the unit 101 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

Figure 4:
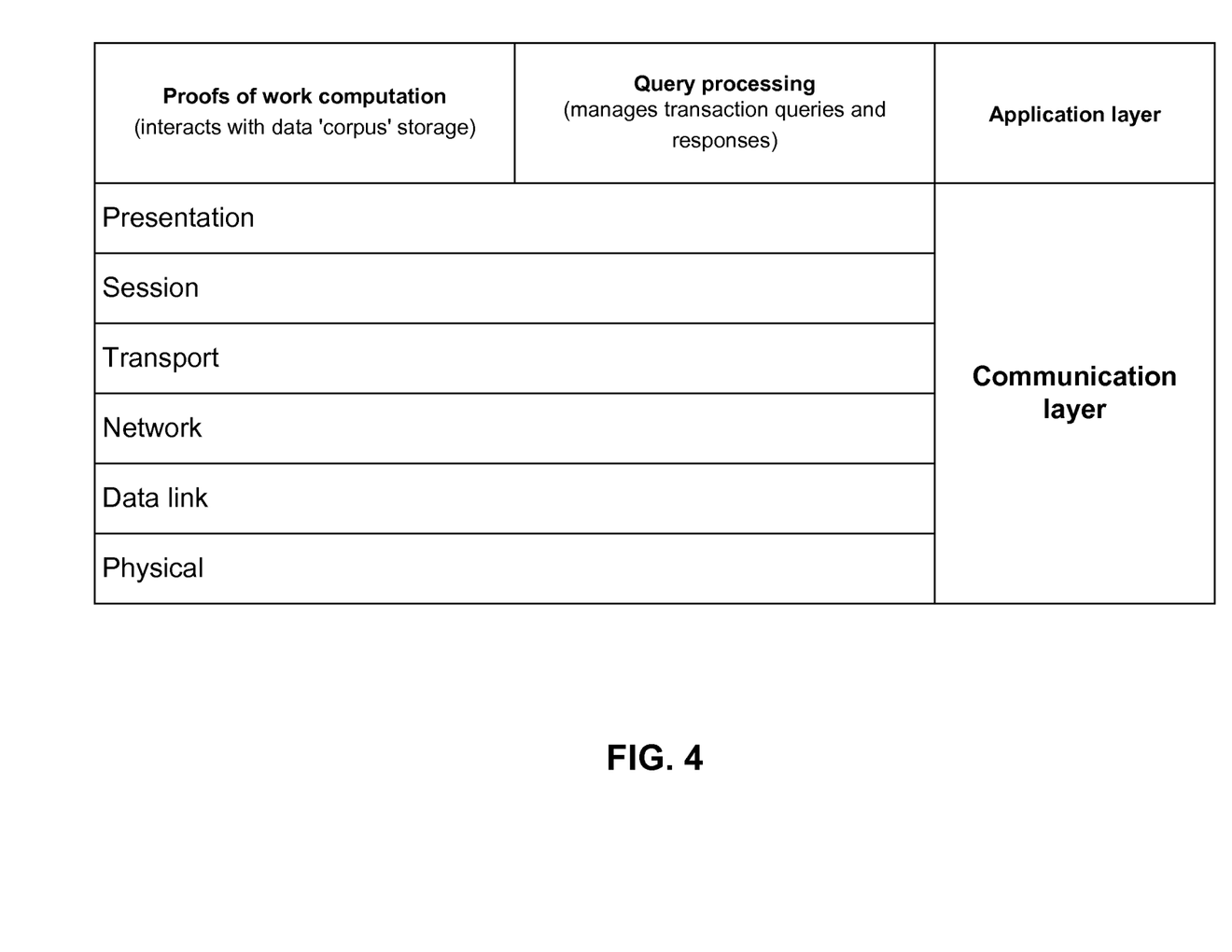
FIG. 4 is a table schematically illustrating communication layer components and application layer components, according embodiments of the present invention.

As illustrated in FIG. 4, in typical embodiments, the application layer essentially includes the components necessary of the PoW computation (i.e., related to steps S10-S60 in FIG. 3) and the query processing (step S70). The PoW computation leads to interactions with the data 'corpus' storage, while the query processing manages transaction queries from and responses to nodes 1-7 (or any connected requestor). The communication layer may, as usual, decomposes in physical, data link, network, transport, session and presentation sublayers. In embodiments, some of these sublayers may not be necessary.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method performing proof of works (PoWs) using cryptography comprising:
    assigning addresses to a plurality of active nodes, wherein each active node triggers crawling operations;
    providing the assigned addresses of each active node to the plurality of nodes, wherein the assigned addresses correspond to a data corpus graph;

assigning crawlers to one or more subgraphs of the data corpus graph;
crawling the plurality of active nodes for a subset of data; acquiring the subset of data;
storing the acquired subset of data at each active node;
indexing the stored subset of data at each active node;
ranking the indexed subset of data at each active node; and
configuring the ranked subset of data for receiving and processing data search queries.

2. The method of claim 1, further comprising:
receiving the data search queries;
distributing the data search queries to each active node; and
transmitting the results of the search queries.

3. The method of claim 1, further comprising:
managing the data search queries, wherein managing the data search queries include organizing search queries, processing search query results or organizing search query results.

4. The method of claim 1, wherein the crawling operations are performed from each active node according to the address assigned to each active node.

5. The method of claim 1, wherein assigning crawlers to the one or more subgraphs of the data corpus graph is achieved by using distributed hash tables, wherein the distributed hash tables are used in a decentralized network, wherein the distributed hash tables prevent undesired interferences.

6. The method of claim 1, wherein assigning crawlers to the one or more subgraphs of the data corpus graph is achieved by using a hierarchical topology system combined with a peer-to-peer network.

7. The method of claim 1, wherein assigning addresses to a plurality of active nodes includes assigning the same address to two or more nodes in the plurality of nodes.

8. The method of claim 7, wherein assigning the same address to two or more nodes in the plurality of nodes creates redundant crawling operations, wherein redundant crawling operations improves a reliability of a result.

9. A computer system for performing proof of works (PoWs) using cryptography, comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
assigning addresses to a plurality of active nodes, wherein each active node triggers crawling operations;
providing the assigned addresses of each active node to the plurality of nodes, wherein the assigned addresses correspond to a data corpus graph;
assigning crawlers to one or more subgraphs of the data corpus graph;
crawling the plurality of active nodes for a subset of data; acquiring the subset of data;
storing the acquired subset of data at each active node;
indexing the stored subset of data at each active node;
ranking the indexed subset of data at each active node; and
configuring the ranked subset of data for receiving and processing data search queries.

10. The computer system of claim 9, further comprising:
receiving the data search queries;
distributing the data search queries to each active node; and
transmitting the results of the search queries.

11. The computer system of claim 9, further comprising:
managing the data search queries, wherein managing the data search queries include organizing search queries, processing search query results or organizing search query results.

12. The computer system of claim 9, wherein the crawling operations are performed from each active node according to the address assigned to each active node.

13. The computer system of claim 9, wherein assigning crawlers to the one or more subgraphs of the data corpus graph is achieved by using distributed hash tables, wherein the distributed hash tables are used in a decentralized network, wherein the distributed hash tables prevent undesired interferences.

14. The computer system of claim 9, wherein assigning crawlers to the one or more subgraphs of the data corpus graph is achieved by using a hierarchical topology system combined with a peer-to-peer network.

15. The computer system of claim 9, wherein assigning addresses to a plurality of active nodes includes assigning the same address to two or more nodes in the plurality of nodes.

16. The computer system of claim 15, wherein assigning the same address to two or more nodes in the plurality of nodes creates redundant crawling operations, wherein redundant crawling operations improves a reliability of a result.

17. A computer program product for performing proof of works (PoWs) using cryptography, comprising:
one or more computer-readable tangible storage media and program instructions stored on at least one of the one or more computer-readable tangible storage media, the program instructions executable by a processor to cause the processor to perform a method comprising:
assigning addresses to a plurality of active nodes, wherein each active node triggers crawling operations;
providing the assigned addresses of each active node to the plurality of nodes, wherein the assigned addresses correspond to a data corpus graph;
assigning crawlers to one or more subgraphs of the data corpus graph;
crawling the plurality of active nodes for a subset of data; acquiring the subset of data;
storing the acquired subset of data at each active node;
indexing the stored subset of data at each active node;
ranking the indexed subset of data at each active node; and
configuring the ranked subset of data for receiving and processing data search queries.

18. The computer program product of claim 17, further comprising:
receiving the data search queries;
distributing the data search queries to each active node; and
transmitting the results of the search queries.

19. The method of computer program product of claim 17, further comprising:
managing the data search queries, wherein managing the data search queries include organizing search queries, processing search query results or organizing search query results.

20. The computer program product of claim 17, wherein the crawling operations are performed from each active node according to the address assigned to each active node.

\* \* \* \* \*